United States Patent [19]
Anderson et al.

[11] 4,278,097
[45] Jul. 14, 1981

[54] HUSKING MACHINE

[76] Inventors: Ronald L. Anderson, 1698 Best La., Eugene, Oreg. 97401; Harry T. Kessler, Jr., 4460 Mill, Eugene, Oreg. 97405

[21] Appl. No.: 100,247

[22] Filed: Dec. 4, 1979

[51] Int. Cl.³ .............................................. A01F 7/02
[52] U.S. Cl. .................................... 130/5 D; 56/105; 130/5 H
[58] Field of Search .............. 130/5 B, 5 C, 5 D, 5 E, 130/5 H, 5 J, 5 F, 5 G; 56/104, 105

[56] References Cited

U.S. PATENT DOCUMENTS

| | | | |
|---|---|---|---|
| 121,384 | 11/1871 | Kenyon | 130/5 D |
| 135,841 | 2/1873 | Philip | 130/5 J |
| 1,444,009 | 2/1923 | Schroeder | 130/5 D |
| 1,696,398 | 12/1928 | Hansen | 130/5 H |
| 2,329,768 | 9/1943 | Kerr | 130/5 G |
| 2,535,485 | 12/1950 | Cover | 130/5 J |
| 2,927,616 | 3/1960 | Bruner | 130/5 J |
| 3,113,574 | 12/1963 | Greedy et al. | 130/5 D |
| 3,158,156 | 11/1964 | Cover | 130/5 C |
| 3,900,036 | 8/1975 | Anderson et al. | 130/5 D |

Primary Examiner—Paul J. Hirsch
Attorney, Agent, or Firm—James D. Givnan, Jr.

[57] ABSTRACT

A machine having a frame supporting multiple husking rolls which rolls jointly act on the article being processed to remove an exterior portion of the article. The rolls are arranged in pairs with at least two pairs in each processing lane of the machine. Each pair of rolls includes a main and secondary roll which rotate so as to have their upper surfaces move toward one another. Articles deposited on the main roll of each pair are carried into the bite of the main and secondary roll. Oscillating panels also act on the articles. Bearing assemblies support the roll ends with a bearing component being self-aligning with its roll shaft. Further, certain of the bearing assemblies are laterally positionable to assure optimum coaction of the rolls on the processed articles.

7 Claims, 5 Drawing Figures

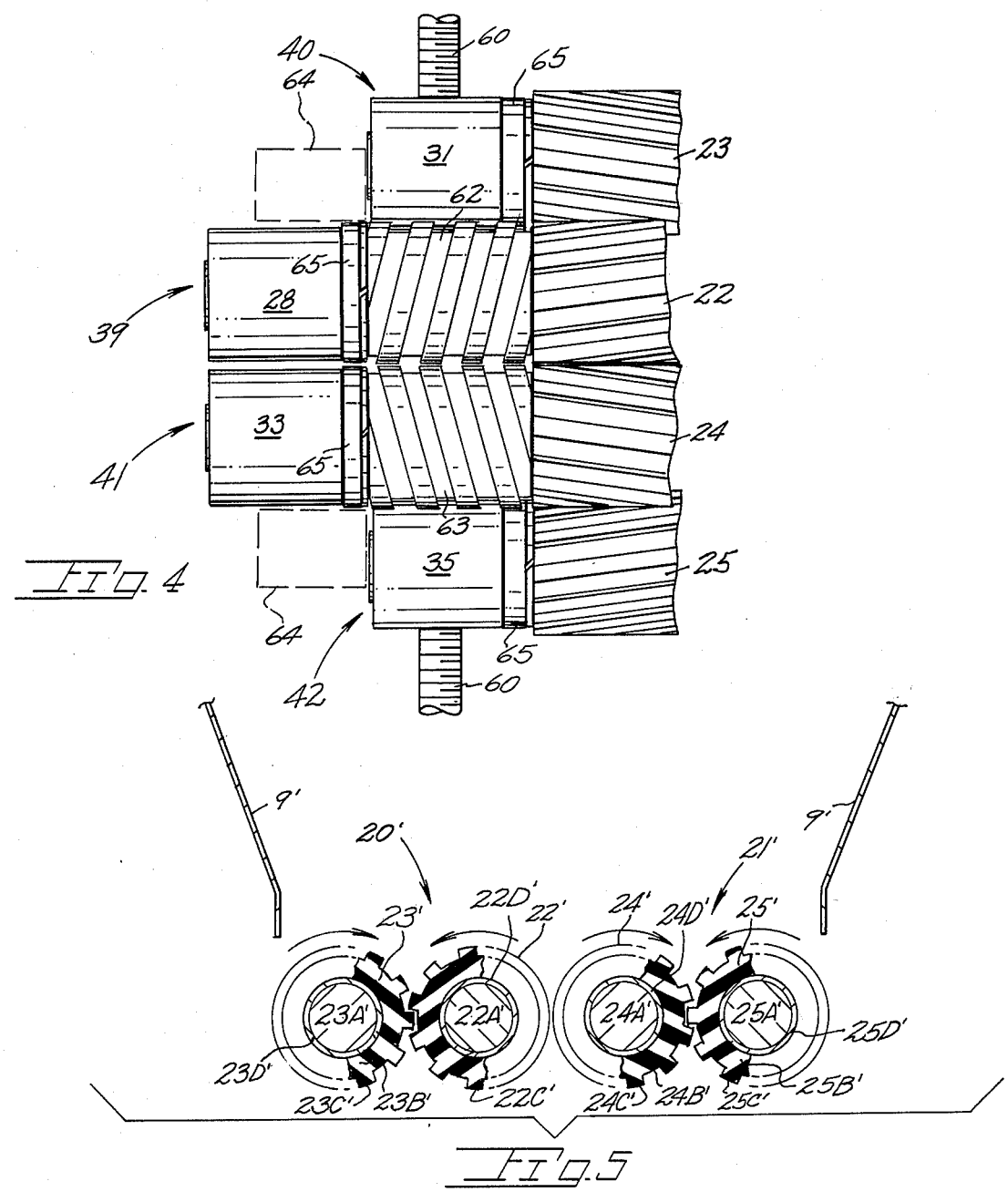

HUSKING MACHINE

BACKGROUND OF THE INVENTION

The present invention relates to food processing equipment and particularly to that type of machine used for removing the husk or exterior of an article of produce.

For several years prior art machines of the above type of which we are aware have commonly utilized cooperating pairs of interengaging elongate rolls for husk removal. Each pair is laterally spaced or isolated from adjacent pairs. The rolls of each pair rotate in opposite directions so that the rolls act in concert to frictionally grip the produce exterior in their bite and pull same from the article. Each pair of cooperating rolls is usually associated with elongate panels arranged in interposed, parallel relationship with the pairs of rolls. The panels on the machine oscillate to promote an uninterrupted flow of produce articles along the rolls and to assure full exposure of the articles to roll action. The panels also serve to confine the produce in place on the rolls the latter being somewhat inclined to promote article passage therealong and ultimate offloading to a conveyor or the like.

The output of such machines is restricted by the relatively narrow pathway along each pair of cooperating rolls. On those machines used for husking ears of corn, care must be exercised to not overload a pair of rolls, otherwise an unacceptable percentage of ears will traverse the rolls without being husked. Further, the narrow pathway or line of travel defined by a subjacent pair of husking rolls and adjacent panels renders same susceptible to jamming by a single ear of corn since a single ear of corn blocks a relatively large portion of the pathway. The rate at which produce is deposited onto a pair of rolls must accordingly be carefully monitored as well as the operation of the machine itself.

Improvements have been made to corn husking machines such as the improved corn husking disclosure in U.S. Pat. No. 3,900,036, issued Aug. 19, 1975, owned by the present inventors. Roll operation in the therein disclosed corn husking machine was substantially improved by the disposition of shaker table chutes so as to discharge ears of corn upon the uppermost roll of each spaced apart pair of rolls. Further, the subject machine of the above patent disclosed the concept of utilizing a flexible pad member subjacent the end of an ear delivery chute to modify presentation of the article to the rolls to minimize damage to the produce. Use of more than two rolls acting in concert is complicated by the fact that bearings form same are confined within a small area rendering bearing installation, adjustment and replacement difficult at best.

SUMMARY OF THE PRESENT INVENTION

The present invention is embodied within a husking machine having bearing assemblies adjustably supporting cooperating pairs of husking rolls to substantially increase machine output over the output of prior art machines of like overall size.

The multiple pairs of husking rolls provide processing lanes along which articles flow. Husking rolls are supported in bearing assemblies permitting full adjustment of same regardless of their close proximity. Each pair of rolls comprises a main and a secondary roll. The main rolls of the two pairs, in juxtaposition, rotate in opposite directions so as to direct produce thereon toward the bite with their respective secondary rolls. Provision has been made in the present machine to readily permit optimum roll positioning and roll shaft to bearing alignment to minimize wear of the rolls and associated components. Bearing assemblies associated with each roll are of compact design incorporating self-adjustment features.

Important objectives of the present husking machine include the provision of a husking machine having a per hour production capacity greatly exceeding that of existing machines taking up substantially the same floor area of a processing plant thus permitting an increase in plant output without costly changes to the facility; the provision of a husking machine having several processing lanes with each lane having at least two pairs of husking rolls with each pair comprising a main and a secondary roll which counter rotate to cause their uppermost surfaces to move toward one another; the provision of a husking machine having at least two pairs of husking rolls located within a processing lane of the machine with the main roll of each pair rotating in a direction so as to cause their uppermost surfaces to move away from one another and toward their respective secondary rolls; the provision of a husking machine with processing lanes of greatly increased width so as to greatly reduce the risk of produce jamming; the provision of a husking machine incorporating novel bearing assemblies to support paired rolls in surface contact with one another while permitting precise adjustment of roll frictional contact in a convenient manner; the provision of bearing assemblies which have self-aligning, adjustable bearings positionable about multiple axes and lend themselves to low cost maintenance; the provision of husking roll extensions adapted to assure self-cleaning of two rolls by propelling debris past a stationary bearing surface associated with the companion roll.

BRIEF DESCRIPTION OF THE DRAWINGS

With attention to the accompanying drawings:

FIG. 4 is an enlarged plan view of that portion of the machine encircled at 4 in FIG. 1; and FIG. 5 is a view similar to FIG. 2 showing a modified roll arrangement.

DETAILED DESCRIPTION OF THE PREFERRED EMBODIMENTS

Figure 1:
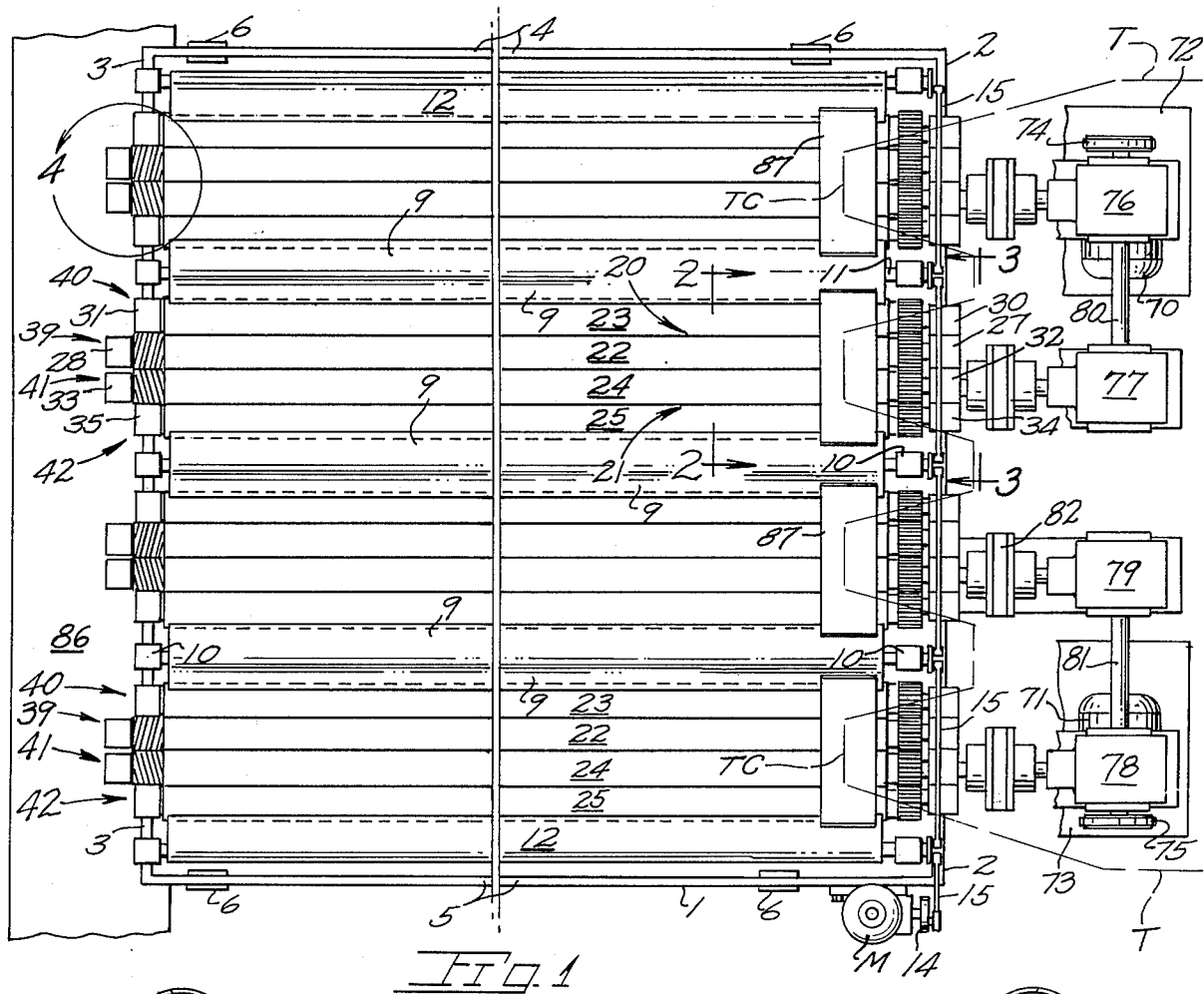
FIG. 1 is a plan view of the present husking machine sectioned for purposes of illustration.

With continuing attention to the drawings wherein applied reference numerals indicated parts similarly hereinafter identified, the reference numeral 1 indicates a rectangular, elevated frame of the present machine.

Frame 1 comprises frame members 2 and 3 associated respectively with the onloading end of the discharging or offloading end of the machine while interconnecting frame members are at 4 and 5. Legs 6 support frame 1 in an elevated and inclined manner so as to cause later described husking rolls to be inclined downwardly toward the discharge end of the machine desirably at about six degrees.

Located adjacent the onloading end of the machine is a shaker table shown in phantom lines T which is also inclined and powered in a vibratory manner so as to cause produce articles thereon to uniformly migrate toward article discharging table chutes indicated at TC. For a general understanding of a shaker table to husking machine relationship, reference is made to our earlier mentioned U.S. Pat. No. 3,900,036 wherein a shaker table is disclosed proximate the onloading end of husking machine rolls. The shaker table constitutes no part of the present invention.

Figure 3:
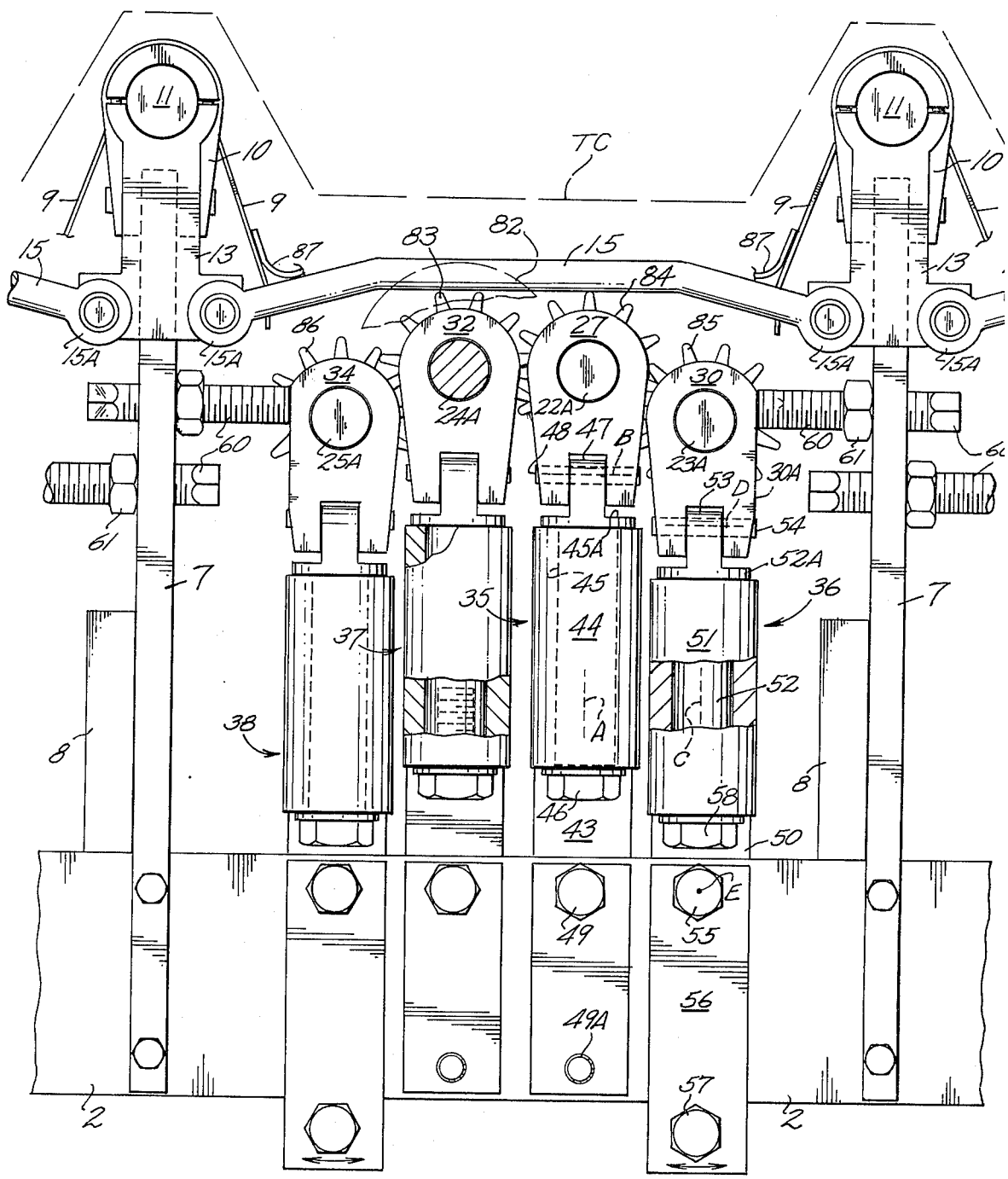
FIG. 3 is a vertical sectional view taken along line 3—3 of FIG. 1 showing on an enlarged scale the bearing assemblies supporting the roll shafts of two pairs of rolls.

In place on frame members 2 and 3 of the machine, at spaced intervals therealong, are upright bearing support plates as typically shown at 7 in FIG. 3. Gussets at 8 reinforce bearing support plate attachment to their respective frame members. In place atop each bearing support plate are panel shaft bearings 10 in each aligned pair of which is journalled a panel carrying shaft 11. Each shaft 11 carries an inverted V-shaped panel 9 having downwardly and outwardly extending panel surfaces. The panels are of formed sheet metal capable of rapid oscillation for agitation and confinement of articles processed on the later described rolls. Imparting oscillatory movement to each widely spaced apart panel are a series of connector rods 15 each pivotally coupled at its end at 15A to a shaft mounted crank plate 13. A motor M (FIG. 1) at one side of the machine is of the gearhead type and drives an eccentric at 14 to impart reciprocal movement to an end located connector rod 15. Accordingly, powered rotation of eccentric 14 imparts oscillatory motion to the panels. Side located panels at 12 are essentially the same as panels 9 with the exception that one panel surface has been dispensed with.

Figure 2:
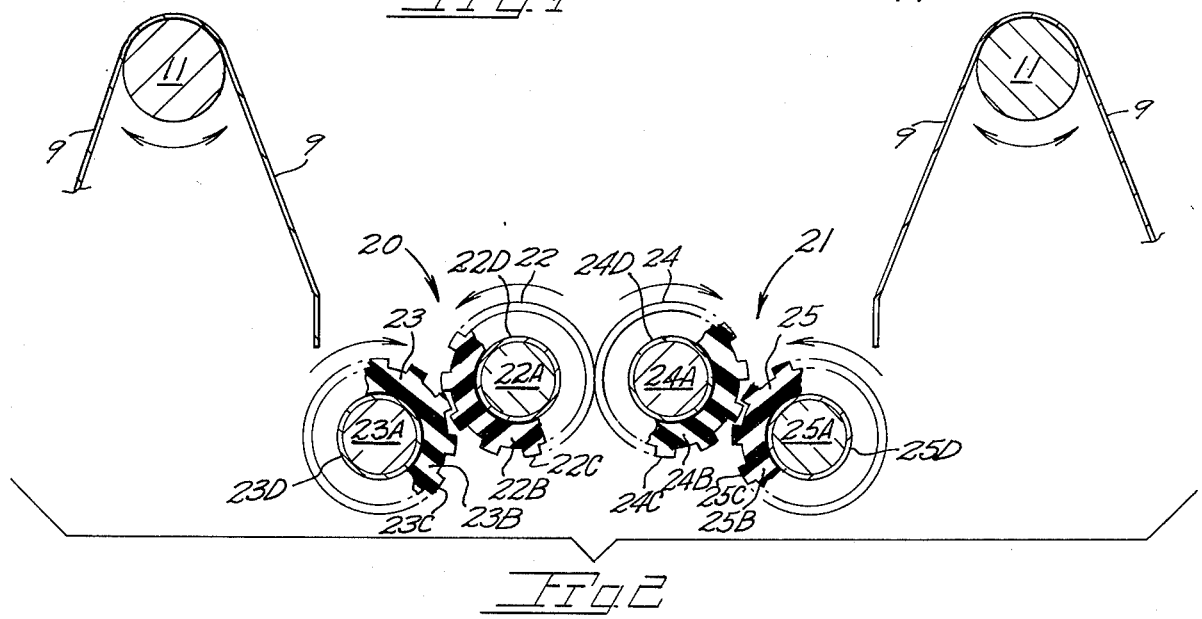
FIG. 2 is a vertical sectional view taken along line 2—2 of FIG. 1.

With attention to FIG. 2 wherein rolls of a typical processing lane of the present machine are disclosed with a first pair indicated generally at 20 and including a main roll 22 and its companion or secondary roll 23. Each roll comprises a roll shaft at 22A-23A on which are carried elastomeric sleeves as at 22B-23B the sleeves being shaped so as to have helical lands at 22C-23C which allow interengagement of one another to exert a desired bite or gripping action on the exterior of the article being processed. Each roll is approximately two and three-quarters inch diameter and several feet in length. The pair of rolls, generally at 20, rotate in the direction of their associated arrows, i.e., in a counter-rotating manner to cause the uppermost surface of the rolls to move toward one another. Similarly, a second pair of rolls, indicated generally at 21, includes a main roll 24 and a secondary roll 25 each having a lengthwise extending shaft 24A-25A, elastomeric sleeves as at 24B-25B with lands 24C and 25C formed thereon so as to allow interengagement of one another during rotation in the direction of the associated arrows. The roll surfaces moving toward one another coact to dislodge the article exterior and forcefully draw same from the article through the roll bite for discharge past the roll underside. Sleeves 22B, 23B, 24B and 25B are carried on tubular cores 22D, 23D, 24D and 25D which are keyed to their respective shafts to facilitate timing of the shaft pairs.

The main roll of each pair (rolls 22 and 24) rotates so as to cause its uppermost surfaces to travel away from the other main roll to direct articles deposited thereon toward their associated or respective secondary rolls. Main rolls 22 and 24 are in close juxtaposition to one another.

With attention again to the first described pair of rolls indicated generally at 20, roll shaft 22A is journalled at its opposite ends within bearings 27 and 28 (FIG. 1) while, similarly, shaft 23A of its companion roll is journalled within similar bearings at 30 and 31. Bearings 27, 28 and 30, 31 are components of later described bearing assemblies.

Similarly, the second pair of rolls, rolls 24 and 25, have shaft ends journalled in a similar manner within bearings 32-33 and 34-35 of later described bearing assemblies. From the foregoing it will be seen that each pair of roll shafts 22A-23A and 24A-25A is arranged in parallel generally intermediate a pair of panels 9. Processed articles travel along the gently inclined rolls moving from right to left as viewed in FIG. 1. It will be noted, with regard to FIG. 2, that the axes of the main rolls 22 and 24 are upwardly offset from the axes of secondary rolls 23 and 25.

In FIG. 3, we show novel bearing assemblies for supporting the corresponding ends of the several closely juxtaposed roll shafts of a processing lane in a manner permitting shaft adjustment and bearing movement about multiple axes for longer component life.

In FIG. 3, bearing assemblies are indicated generally at 35, 36, 37 and 38 with each assembly being similar. Further, the bearing assemblies at 35 through 38 are similar to bearing assemblies indicated at 39, 40, 41 and 42 supporting bearings 28, 31 and 33, 35 at the remaining ends or offloading ends of the roll shafts. Those bearing assemblies supporting bearings 28 and 33 are preferably offset outwardly from frame member 3, as shown in FIG. 1, so as to offset main roll bearings 28 and 33 from secondary roll bearings 31 and 35. Such offsetting of the bearing assemblies is accomplished by the installation of a bracket (not shown) on frame member 3 to receive the lower ends of the two offset bearing assemblies.

A main roll bearing assembly as at 35 (and typical of other main roll bearing assemlbies) includes an elongate plate 43 on which is carried a sleeve 44. Pivotally carried within sleeve 44 is a pivot pin 45 having a flange 45A in rested engagement with the sleeve upper end. A head 47 on the pin is apertured to receive a pin 48 which extends through the bifurcated lower end of bearing 27. From the foregoing it will be seen that bearing 27 may pivot about an upright axis A of pivot pin 45 as well as about the horizontal axis B of pin 48. The lower end of each bearing plate 43 is secured to frame member 2 as by a fastener assembly 49 and a locking pin 49A to frame member 2. A bolt 46 in threaded engagement with the lower end of pin 45 retains same against upward displacement.

With attention still to FIG. 3, a description follows of a typical secondary roll bearing assembly at 36 which description is equally applicable to the remaining secondary roll supporting bearing assemblies 38, 40 and 42. A bearing plate at 50 is elongate and serves to support a sleeve 51 within which is rotatably carried a pivot pin 52. A pin flange at 52A rests on the sleeve upper end while a head 53 of the pin 52 is received within the lower bifurcated end of bearing 30. A pin at 54 pivotally couples pin head 53 to bearing 30 to permit bearing movment about the horizontal axis D of pin 54. Bearing 30 is positionable about an axis C of pivot pin 52 and about axis D of pin 54, normal to axis C, to provide a bearing for roll shaft 23A that is adjustable in the manner described with bearing assembly 35. A bolt 58 is in threaded engagement with the lower end of pin 52 to retain same against upward displacement.

Additional adjustable movement for each secondary roll shaft in a lateral direction is provided for by frame mounting means including the lower end segment of plate 50. A fastener assembly at 55 extends through said plate as well as through frame member 2 and a clamping member 56. A second fastener assembly at 57 serves to bias clamping member 56 toward plate 50 to thereby exert a clamping force on frame member 2 to hold the bearing assembly 36 in place. From this it will be seen that bearing assembly 36 has an additional capability of being positionable about an axis E of fastener 55 to enable lateral displacement of secondary roll 23 important for the purpose of accomplishing desired engagement of roll 23 with its main roll 22. A flat at 30A on bearing 30 receives the end of positioning means shown as an adjusting screw 60 held in place by upright bearing support plate 7 and locked thereto by a locknut 61. Since both secondary rolls 23 and 25 have both of their ends supported by bearing assemblies as at 36 and 40; 38 and 42, it will be seen that their rolls may be laterally adjusted into desired frictional contact with the roll surfaces of their main rolls with precise positioning being possible. An additional important benefit of such a bearing arrangement is that such enables precise self-alignment of the shafts and their bearings which greatly prolongs bearing life. The main roll bearing assemblies at 39 and 41 are offset as earlier mentioned from their supporting frame member 3.

With attention to FIG. 4, it will be seen that both main rolls 22 and 24 have helical grooved extensions at 62 and 63 each of which is considered part of its main roll and rotates therewith so as to propel any waste material resting on the main and secondary rolls past the bearings 31 and 35 for downward discharge in areas indicated at 64. The bearings are of less diameter than the roll diameters to prevent frictional contact with the helical main roll extensions 62 and 63.

With continuing attention to FIG. 4, internally threaded rings as at 65 engage each roll shaft to confine roll components in place.

A power source for driving the rolls includes motors at 70–71 mounted on frame carried platforms 72–73. Power transmission means includes V-belt drives at 74–75 which drive pairs of speed reducers 76, 77 and 78, 79 with each pair coupled by a shaft 80 and 81. The speed reducers are suitably supported on the machine frame. Shaft couplers as at 82 couple the output shaft of each speed reducer with a roll shaft end 24A. Rotational motion is imparted to a gear 83 (FIG. 3) and to the remaining rolls of a processing lane by spur gears 84, 85 and 86 respectively affixed to remaining roll shaft 22A, 23A and 25A.

In one machine embodiment the motors 70, 71 are seven and one-half horsepower and drive the rolls at approximately 400 RPM. Motor M for driving panels 9 and 12 may be one horsepower to drive the panels at 175 CPM.

Desirably, panel carried pliable belt segments at 87 overlie in a slightly elevated manner the upper ends of the rolls of each lane to deflect the leading end of a deposited ear of corn from approaching the rolls at a steep angle resulting in product waste. Further, the belt segments inhibit any upward migration of the deposited produce articles.

In operation, ears of corn for example are preferably deposited on the husking machine main rolls typically, but not restrictively so, from a shaker table which includes a vibratory surface terminating in a chute or chutes disposed over the onloading ends of the husking machine rolls. In view of the much wider processing lanes now achieved with the present husking machine, the deposit of the articles thereon is not as critical as deposit of same on earlier husking machines having narrower two roll lanes and hence more susceptible to jamming. Product delivery could be by means other than presently used shaker tables.

The produce articles migrate down the gently inclined rolls toward a conveyor 86 with the helical extensions 62, 63 serving to move any debris (not passing through a pair of rolls) past the roll bearings of their adjacent secondary rolls.

The processing lane roll arrangement of four rolls presently utilized greatly increases machine per hour output to between two and three times the per hour output of prior husking machines having isolated pairs of rolls disposed intermediate oscillating machine panels. This greater output permits the present rolls to have a lesser inclination than previous machine rolls to increase the time of exposure of a produce article to roll action for greater husking efficiency.

In FIG. 5, we show a modified arrangement of the rolls of a processing lane (similar to those shown in FIG. 2) wherein parts of the rolls and panels are indentified with prime reference numerals analogous to those identifying earlier described counterparts. The roll axes are disposed in a single plane in distinction to the earlier described roll arrangement with consequent greater spacing of the roll supporting bearings (not shown) which are of the same type earlier described.

While we have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A husking machine for removing an exterior portion of produce articles and comprising,
   a frame,
   processing lanes having husking rolls with irregular surfaces and arranged in inclined juxtaposed pairs with each pair having a main and a secondary roll in interengagement with one another, said rolls having corresponding onloading and offloading ends with the onloading ends elevated relative to said offloading ends, the main and secondary roll of each pair driven so as to cause their uppermost surfaces to move toward one another to jointly act on the produce articles, the main rolls of each pair in close juxtaposition to one another, the main rolls of said juxtaposed pairs driven so as to cause their uppermost surfaces to move away from one another so as to move produce articles deposited thereon toward their respective secondary rolls, the produce articles discharged from the offloading ends of the rolls after passage downward therealong,
   power transmission means in driving engagement with said rolls,
   each of said husking rolls having shaft ends, and
   bearing assemblies on said frame each including a bearing receiving a roll shaft end, said bearing assemblies further including a pin having a horizontal axis transverse to the roll axis and about which said bearing may move.

2. The machine claimed in claim 1 wherein said bearing is further adapted for movement about an upright axis.

3. The machine claimed in claim 1 wherein said bearing assemblies include an upright sleeve, a pivot pin carried by said sleeve and adapted for rotational movement relative said sleeve whereby each bearing assembly bearing supported by said pivot pin is adapted for rotational movement about a projected axis of said pivot pin.

4. The invention claimed in claim 3 wherein said bearing assemblies pin couples the sleeve carried pivot pin to the bearing assembly bearing.

5. The invention claimed in claim 1, 2, 3, or 4 wherein certain of said bearing assemblies include frame mounting means enabling lateral displacement and securement of said certain bearing assemblies and the roll shaft ends supported thereby relative the remaining roll of the roll pair.

6. The invention claimed in claim 5 additionally including positioning means operable intermediate said frame and said certain bearing assemblies to urge the bearing assemblies and the rolls carried thereby in a lateral direction toward the remaining roll of the roll pair.

7. The invention claimed in claim 5 additionally including panels disposed parallel to and intermediate the secondary rolls of adjacent processing lanes and means imparting oscillation to said panels.

* * * * *